June 23, 1970 A. A. AVIZIENIS 3,517,171

SELF-TESTING AND REPAIRING COMPUTER

Filed Oct. 30, 1967 6 Sheets-Sheet 1

ALGIRDAS A. AVIZIENIS
*INVENTOR.*

*BY*
Lindenberg & Freilich
ATTORNEYS

INVENTOR.
ALGIRDAS A. AVIZIENIS

BY

ATTORNEYS

ALGIRDAS A. AVIZIENIS
*INVENTOR.*

BY
Lindenberg & Freilich
ATTORNEYS

SELF-TESTING AND REPAIRING COMPUTER

Filed Oct. 30, 1967 6 Sheets-Sheet 4

ALGIRDAS A. AVIZIENIS
*INVENTOR.*

BY Lindenberg & Freilich

ATTORNEYS

INVENTOR.
ALGIRDAS A. AVIZIENIS
BY
Lindenberg & Freilich
ATTORNEYS

INVENTOR.
ALGIRDAS A. AVIZIENIS
BY
Lindenberg & Freilich
ATTORNEYS

3,517,171
SELF-TESTING AND REPAIRING COMPUTER

Algirdas A. Avizienis, Los Angeles, Calif., assignor, by mesne assignments, to the United States of America as represented by the Administrator of the National Aeronautics and Space Administration

Filed Oct. 30, 1967, Ser. No. 679,055
Int. Cl. G06f *11/04*
U.S. Cl. 235—153 10 Claims

ABSTRACT OF THE DISCLOSURE

A computer system composed of a number of functional units, each performing a major function, the system including a Control and Diagnostic Unit (CDU) which continually monitors the units for faults and replaces a faulty unit by switching off its power and switching on power to its replacements. The functional units commuicate with each other over only two busses, and all communicated words are encoded by error-detecting codes. As a result, two bus checking units which monitor the two busses detect errors indicated by the codes and send fault indicating signals to the CDU. When a fault is detected, the CDU stops the program and resumes it at a previous rollback point indicated on the computer program. The program contains numerous rollback points along it, at which the computations can readily be resumed. If the fault persists, the faulty unit is replaced.

ORIGIN OF THE INVENTION

This invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Field of the invention

The invention relates to computer systems, and, more particularly, to self-testing and repairing computer systems.

Description of the prior art

Reliable performance of digital systems is usually attained by selecting highly reliable components and packaging, and by utlizing extensive verification techniques for the design and for the programs. Despite the use of such reliability-assurance techniques, the system may still fail during use because of uncontrollable or undetected faults. Such faults may arise due to undetected design errors, random failures of components or connections, and externally induced failures due to radiation, sparks, mechanical damage, and other environmental conditions. The effects of such faults can be controlled by the introduction of protective redundancy to the system. Protective redundancy refers to the use of additional components or systems to mask or to replace a faulty portion of the system.

One application of digital systems which requires extreme reliability is in guidance and control computers for unmanned spacecraft. Such computers are required to survive space voyages to other planets which range up to several years in length, performing on-board processing of scientific data during most of the voyage and performing approach guidance and control computations at the end of the voyage. The computer systems for such applications are almost fully utilized during approach to the planet, and it is desirable to provide means for rapidly replacing defective components during computations while employing the computer at high capacity.

Two basic approaches to system design for fault tolerance have been suggested. One approach is the use of massive triple modular redundancy (TMR) in which logic signals are handled in three identical channels and faults are masked by vote-taking elements distributed throughout the system. The other approach is selective redundancy in which the system is monitored for faults, and faulty elements are replaced with spares. While the TMR approach has some advantages over the selective redundancy approach, including immediate correction of faults, elimination of the need for fault detection apparatus, and simplicity of design, the selective redundancy approach also has many advantages. The advantages of the selective redundancy approach over the TMR approach include the fact that power is required by only one copy of most replaceable items, all spares can be utilized, the difficult initial checkout characteristic of TMR systems is eliminated, and transient faults such as those due to sparks can be tolerated by the system. Extensive design studies have indicated that a selective redundancy system would be desirable in certain applications, including those for unmanned spacecraft on long duration missions.

A selective redundancy system must be designed to perform special functions in addition to the ordinary functions of a computer. Specifically, the system must incorporate some means of fault detection, a recovery procedure to allow for the case of transient faults, a replacement procedure including switching means for the case of permanent faults, and a check-out procedure for application to all spares before the mission.

Among important requirements of a selective redundancy system to the provision of means for detecting a wide variety of faults, including those which can be indicated by the use of error-detecting codes and those which cannot. Another requirement, which is among the most fundamental hardware considerations, is the provision of a switching arrangement for reliably eliminating a defective unit, even in the case of catastrophic failure and replacing it with a spare. The reliability of such a switching arrangement is a limiting factor in the reliability of the entire system.

OBJECTS AND SUMMARY OF THE INVENTION

Accordingly, one object of the present invention is to provide a computer system for automatically correcting a wide variety of faults within the system, which can tolerate a greater number of faults than systems available heretofore;

Another object is to provide a self-repairing computer system which utilizes a minimum of power.

In accordance with the invention, there is provided a self-testing and repairing computer system subdivided into several replaceable functional units. Each functional unit performs a major function of the system. Various circuits are provided to monitor the system for faults, these circircuits located both within the functional units and in two separate checking units whose only function is to detect certain types of faults. A separate Control and Diagnosis Unit (CDU) receives all fault indication signals and controls recovery procedures. The recovery procedures include testing of the possibly faulty units and placing the units when necessary.

The two separate checking units whose only function is to detect certain types of errors, operate by monitoring the communication channels connecting the unit to detect faulty outputs. The inclusion of only two separate checking units to monitor the communication channels is made possible by utilizing a limited number of busses for carrying all data internally, and by encoding all data in error-detecting codes. If the output from any functional unit to a bus is erroneous, the bus checking unit monitoring the bus detects the error. When a permanent fault is detected, the offending unit is replaced with a spare.

The fault-detecting circuits within each functional unit have an output line connected to the CDU to indicate the existence of faults, such as disagreement between a duplicated internal sign detection circuit, which would not necessarily be indicated on the encoded word output. Each functional unit also has output lines connected to the CDU indicating whether or not it is delivering output data at every instant. The CDU checks whether each functional unit is operating and is quiescent when it should be to further detect the existence of faults.

If the CDU determines that a fault exists, it interrupts the current program and executes an emergency sequence. First, a segment of the current program is repeated from a designated "rollback point" instruction in order to correct the error, if it was due to a transient fault. If the fault persists, the faulty unit is replaced by a spare by switching off power from the faulty unit and switching on power to its spare. After such replacement, the program is again "rolled back," i.e., resumed at the instruction designated as the "rollback point." The program executed by the computer contains many specified rollback points, which are convenient points at which to resume computations. This eliminates the need to roll back to the beginning of the entire program, and therefore reduces the time required to correct a fault.

The replacement of faulty units by their spares is a highly critical operation. Instead of switching the many input or output lines of a faulty unit, replacement is accomplished merely by removing power from the offending unit and applying it to the spare. The units are constructed so that they deliver logic zero outputs when not functioning. Most of the units are constructed so that, when they are serving as spares on a standby basis, they do not consume any power.

The computer generally employs words of 32-bit length. The machine words are carried by the busses to the functional units in 4-bit bytes, that is, in a series-parallel mode. There are primarily two different types of words, numeric operand words and instruction words. Both types have a 32-bit, or 8-byte length. The numeric operand word contains the information to be processed. The other type of word, the instruction word, contains a 3-byte operation command portion indicating the operation to be performed, such as an addition and a 5-byte address portion indicating the address in the memories at which the numeric operands to be processed can be found.

The numeric operand words and the instruction words are encoded by three different error-detecting codes. The 8-byte numeric operand is encoded by a product code. The product encoding method is desirable for enabling the detection of errors of the type most likely to occur in arithmetic processing. The instruction word employs two different codes, one for the 3-byte operation command and a separate one for the 5-byte address portion. The operation command portion has a "two-out-of-four" encoding, wherein every 4-bit byte contains two 1's and two 0's This is efficient for detecting the type of errors most likely to occur in transmission. The address portion is encoded by a residue code. This code is efficient for the operations generally performed with the address portion.

Two busses carry all of the data transmitted between the functional units, including the numeric operands and the instruction words. The bus checking units which monitor the busses check all information transmitted, and detect errors in any of the three type of encoded words. The product and residue codes utilize the same checking circuits inasmuch as they are identical from the standpoint of error detecting.

Each instruction of the program is accomplished in three phases, referred to as phases 1, 2, and 3. In phase 1, the memory units are requested to deliver an instruction. In phase 2, the memory units deliver an instruction word which commands one or more of the functional units to act during phase 3 and which carries an address which may be indexed. After any indexing, the instruction word address is delivered to the memory units to indicate the address of the numeric operand word they must deliver during phase 3. In phase 3 a memory unit may deliver a numeric operand and the functional unit commanded during phase 2 to act on it, acts on it.

The novel features of the invention are set forth with particularity in the appended claims. The invention will best be understood from the following description when read in conjunction with the accompanying drawings.

DESCRIPTION OF THE PREFERRED EMBODIMENTS

To facilitate an understanding of the invention, the following description is presented in five parts. Part 1, entitled "General Description," describes the overall system shown in FIG. 1. Part 2, entitled "Description of Codes," describes the three error-detecting codes used for encoding information carried over busses between functional units of the system. Part 3, entitled "General Description of Functional Units," describes the functions of the various functional units in relation to the operation of the system. Part 4, entitled "Description of Control and Diagnostic Unit," describes the construction and operation of this unit; this part also describes the control arithmetic processor. Part 5, entitled "Detection of Faults in Control Arithmetic Processor and Main Arithmetic Processor," describes the operation of the Control and Diagnostic Unit in relation to these two units.

(1) General description

Figure 1:
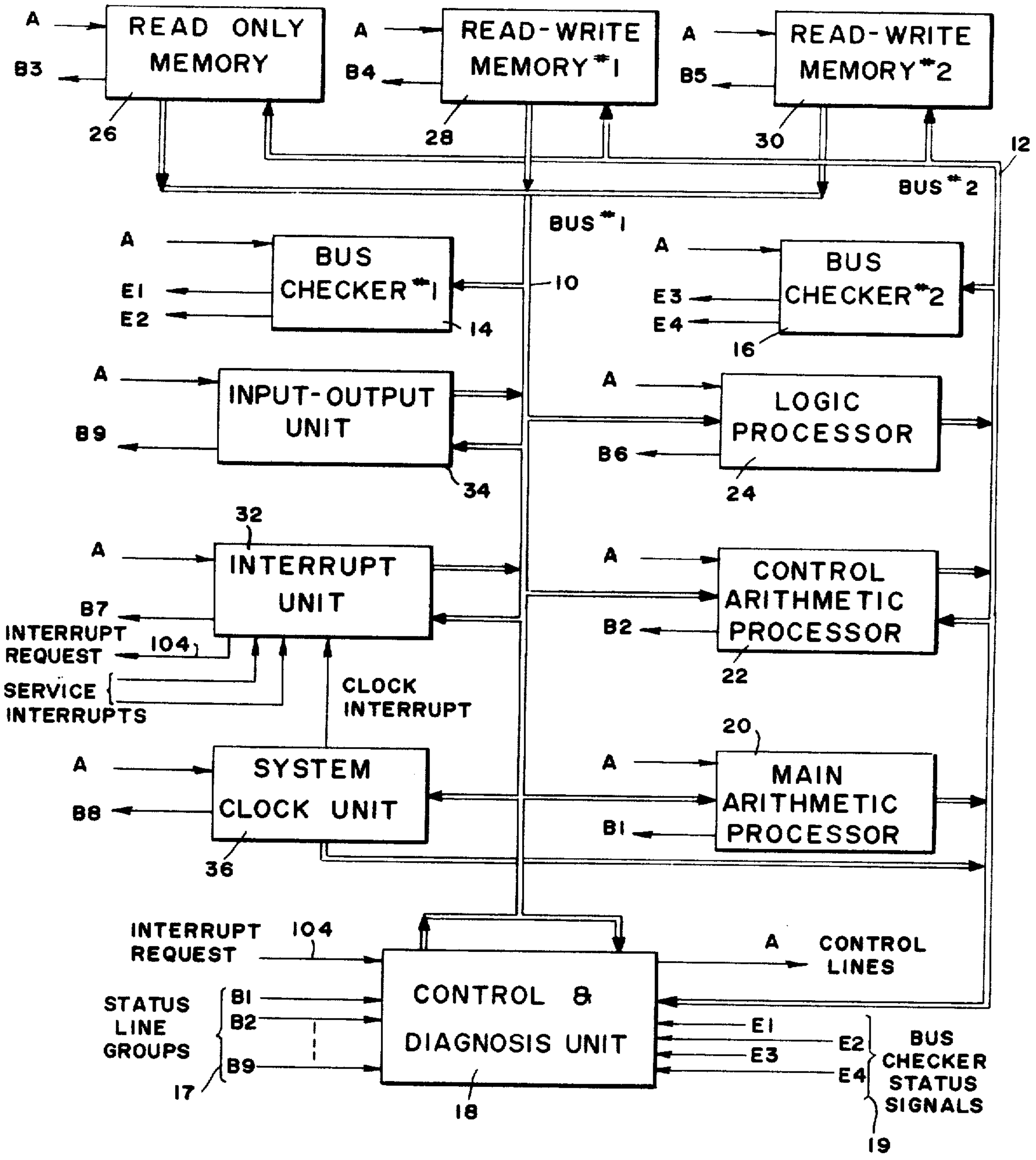
FIG. 1 is a block diagram of a computer system constructed in accordance with the invention.

FIG. 1 is a block diagram showing the general organization of the computer system of the invention. The particular system shown is a fixed-point binary computer suitable for spacecraft guidance applications. The system is divided into replaceable functional units connected together by two busses 10 and 12, referred to as the first and second busses, respectively. The busses carry information words between functional units. Each information word generally comprises eight serially-delivered bytes, each byte containing four bits. Accordingly, each bus 10 and 12 has four conductors for carrying the four bits in parallel.

The monitoring of the system for faults is accomplished by two bus checkers 14 and 16, a Control and Diagnosis Unit (CDU) 18, and fault detecting circuitry in each of the nine other functional units. The CDU 18 has nine groups of inputs, B1 through B9, referred to as its status line groups 17, each of the nine groups comprising three lines from one of nine functional units. The CDU 18 also has four bus checker status signal inputs E1, E2, E3 and E4, shown at 19, which are connected to the outputs E1, E2, E3 and E4 of the bus checkers 14 and 16. Faults which result in the generation of erroneous data are indicated to the CDU 18 by signals received over the bus checker status inputs 19. Faults which result in the malfunctioning of a unit, but which may or may not result in obviously erroneous data words, are detected by the CDU through monitoring of the status line groups 17. The CDU serves as a control means responsive to fault indicating signals for performing fault-correcting procedures. The bus and bus checkers, and the status line groups and circuitry within the CDU connected to the status line groups, serve as monitoring means for monitoring the functioning of the functional units.

The bus checkers 14 and 16 are enabled to detect errors in transmitted data by reason of the encoding of the data by error-detecting codes. Substantially all of the information transmitted between functional units is carried on one of the busses 10 and 12, and all of such data is encoded. Three different codes are used for three different types of information. Each bus checker is capable of detecting errors in words encoded in any of the three codes. If such an error is detected, one of the inputs E1 through E4 of the CDU indicates its occurrence, and the CDU can determine which functional unit is at fault by noting which unit has delivered the information.

(2) Description of codes

Three different error-detecting codes are utilized for optimum encoding of three types of information which is transmitted over the two busses between the functional units. One type of information is the numeric operand word, which constitutes the data to be operated upon. Another type of information is contained in an instruction word for indicating the operation to be performed and the address of the operand word upon which the operation is to be performed. The instruction word has two portions: the operation command portion and the address portion, and each of these two portions is encoded by a different code.

Figure 2A:
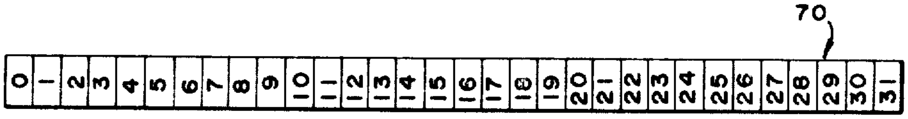
FIG. 2A is a representation of a 32-bit word utilized in the computer system of FIG. 1.
Figure 2B:
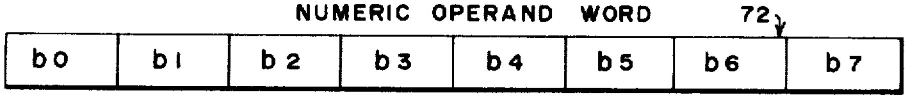
FIG. 2B is a representation of an 8-byte numeric operand word having the form of the word FIG. 2A.
Figure 2C:
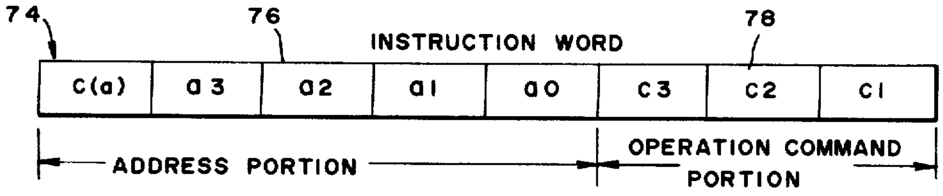
FIG. 2C is a representation of an 8-byte instruction word having the form of the word of FIG. 2A.

FIG. 2A represents a data word 70 of the type transmitted between functional units of the system, comprising 32 bits. FIG. 2B represents a numeric operand word 72 of eight bytes, each byte containing four bits. FIG. 2C represents an instruction word 74 having an operation command portion 76 with three bytes and an address portion 78 of five bytes length. The numeric operand word 72 is encoded by a product code, the operation command portion 78 of the instruction word is encoded by a two-out-of-four code, and the address portion 76 of the instruction word is encoded by a residue code.

The numeric operands, represented in FIG. 2B, are 32 bits long and are binary product-coded numbers with the check factor 15. These operand words are obtained by multiplying an uncoded information word of 28 bits length by 15 to obtain the product-coded 32-bit operands. The check factor 15 has been found to be especially effective in the case of series-parallel transmission and in computing in bytes of 4 bits length. The checking algorithm utilized by the bus checkers 14 and 16 computes the modulo 15 residue of coded words which are transmitted on the busses 10 and 12. A zero residue (represented by 1111) indicates a coded word. All other residues indicate a fault in the functional unit which delivered the word to the bus.

The 32-bit instruction word, represented in FIG. 2C, consists of a 12-bit (3-byte) operation command portion 78 and a 20-bit (5-byte) address portion 76. The address portion is encoded in the residue code with check modulo 15. An address portion consists of a 16-bit binary address $a$, an a 4-bit check symbol, $c(a)$. The check symbol $c(a)$ has the value $$c(a)=15-/a/_{15}$$

where $/a/_{15}$ is the modulo 15 residue of $a$. The checking algorithm, utilized by the bus checkers 14 and 16, computes the modulo 15 residue of an address and adds this modulo 15 residue to the check symbol $c(a)$. It should be noted that the four bytes 90 through 93 of the address portion 76 represent the uncoded address, so the address is available without decoding.

The presence of a properly coded address portion 76 is indicated by the generation of a zero sum (represented by 1111). The residue code is preferable for address portions, as compared with the product code utilized for the operands, because the address, represented by the first 16 bits (the bytes $a0$ through $a3$), is available to the memory address decoding circuits in its ordinary binary form. It should be noted that the "1's complement," $15-/a/_{15}$ rather than the residue, $/a/_{15}$, itself is used as the check cymbol $c(a)$. The use of the 1's complement provides the same faul-detection effectiveness in byte-serial operation as for product-coded operands, while the use of $/a/_{15}$ as a check symbol would give a lower effectiveness. Furthermore, the bus checking algorithm is the same for product-coded operands as for the address portions, which enables the same bus checker circuits to be utilized for both. The checking algorithm is simply a modulo 15 summation of all bytes and a test of the result for the zero value represented by 1111.

The operation command portion 78 of the instruction word represented in FIG. 2C is divided into three bytes of four bits each. The operation command bytes are encoded by a two-out-of-four encoding. Of the sixteen combinations of four bits, six combinations include exactly two "1's" (e.g., 1001 and 0101). Such coding is most efficient for short words and is acceptable in a computer because the operation command portions are not subjected to arithmetic operations. It is evident that the validity of the operation command portions must be tested by a separate circuit, since they cannot be verified by the modulo 15 checker. The separation of the operation command portion into three separately-encoded bytes facilitate the decoding and validity testing of the operation command portions received by the functional units. The two-out-of-four encoding gives a total of 216 distinct combinations for operation codes (because it has three bytes, each byte taking six values to yield $6^3=216$ combinations).

While three different codes are used in the particular embodiment described herein, a single encoding scheme such as the residue encoding with the check modulo 15 could be applied to all three types of data, including the numeric operand words and operation command portions of the instruction words. While the use of one code would have the advantage of identical check algorithms, the use of different codes also has advantages. For example, the two-out-of-four coding for individual bytes of the operation portion permits validation and use of individual bytes. The use of three different codes was selected for a particular system which was constructed to permit a detailed insight into the relative merits and shortcomings of the different codes by observing them in actual operation.

(3) General description of functional units

The block diagram of FIG. 1 illustrates twelve different functional units of the computer system. As mentioned above, the bus checkers 14 and 16 detect errors in words transmitted over the two busses, while the CDU 18 checks for faults and performs recovery and replacement procedures. The system includes a main arithmetic processor 20 which performs arithmetic operations with operands supplied to it, and delivers the results. It also includes a control arithmetic processor 22 which stores the address of the next instruction to be executed and performs indexing (addition of a constant) to the address portion of the current instruction. A logic processor 24 performs bit-by-bit logic operations on operands supplied to it.

A read only memory 26 contains the permanent program and associated constants to be used by the system during a given mission. At least two read-write memory units 28 and 30 are used to store additional programs and data generated in the operations of the computer, and up to 12 such units may be included. An interrupt unit 32 and an input-output unit 34 serve as interfaces for the entire computer system, for receiving information into the computer system and delivering it therefrom. A system clock unit 36 keeps a record of elapsed time and generates signals for the sequencing and time keeping functions of the computer.

Each standard cycle of operation consists of three phases. During phase 1, the address of an instruction is generally sent from the control arithmetic processor 22 to one of the memory units 26, 28 or 30. During phase 2, the memory unit which has been addressed in phase one broadcasts an instruction word. The instruction word consists of an operation command portion and an address portion and is broadcasted to all functional units by delivering the information to the first bus 10 and through the control arithmetic processor 22 to the second bus 12. If required by the operation command, the control arithmetic processor 22 performs an indexing operation on the address. During phase 2, the appropriate units recognize the operation command are thereby prepared to accept the address during phase 2 and/or initiate execution during phase 3. During phase 3, if required by the instruction word, a memory unit delivers an operand to the first bus, the operation is executed, and a result is placed on one of the busses and accepted by the destination unit. Every time information is transmitted between units, the bus checkers 14 and 16 test the word for proper encoding.

Figure 3:
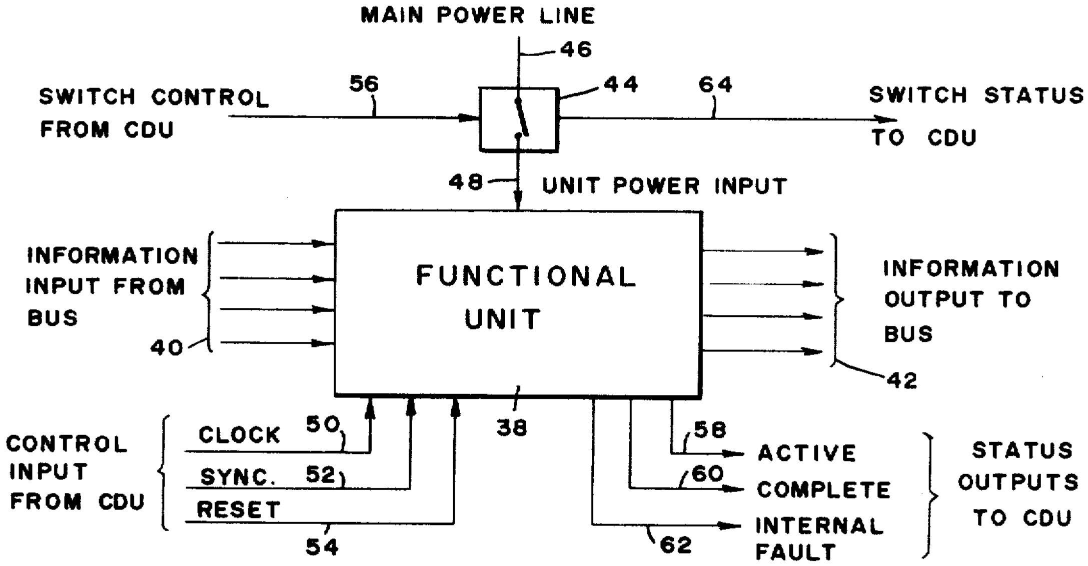
FIG. 3 is a block diagram representation of a generalized functional unit of the computer system of FIG. 1.

FIG. 3 is a block diagram showing the input and output lines leading to a typical functional unit of the computer system. The unit 38 has a set of four input lines 40 and four output lines 42 for receiving information and delivering it to the busses, one byte at a time. A power switch 44 selectively connects power from a main power line 46 to the unit power input 48 to operate the unit. A switch control line 56 delivers signals from the CDU to open or close the switch, while switch output line 64 delivers a signal to the CDU to indicate whether the switch is open or closed.

The functional unit 38 has three additional input lines comprising a clock input 50, a sync input 52 and reset input 54, which are all connected to the CDU. The clock input 50 supplies the unit with a train of clock pulses, the sync line 52 provides synchronization pulse signals, and the reset line 54 provides a signal which resets the unit from its present internal configuration to a standard initial state. Three status output lines are provided which are also connected to the CDU, these being an active line 58, a complete line 60, and an internal fault line 62. The active line 58 provides signals that indicate that the unit is delivering information to its output bus. The complete line 60 provides a signal when the unit has completed an operation designated by the present instruction. The internal fault line 62 provides signals when an internal monitoring circuit of the unit 38 detects an abnormal condition.

A general understanding of the operation of the computer system can be had by considering, in somewhat greater detail, the functions performed by each of the functional units shown in FIG. 1. The main arithmetic processor 20 performs all of the arithmetic operations on the 32-bit numeric operand words (shown at 72 in FIG. 2A) of the computer system. It receives inputs consisting of an operation command (e.g., add, subtract, multiply, or divide) during phase 2 and a coded numeric operand during phase 3. The output of the processor during phase 3 comprises one or more 32-bit words followed by a two-out-of-four condition code byte. The condition code byte indicates one of three irregularities (sum overflow, quotient overflow, or zero divisor), or, if the result is good, the type of result (positive, zero, or negative). If the result is good, the control arithmetic processor 22 stores the condition code output of the main arithmetic processor 20 for use during conditional jump instructions. All results are delivered to the second bus 12 during phase 3, where they are monitored by the second bus checker 16.

The control arithmetic processor 22 performs the functions of storing and indexing addresses, and of delivering the addresses to the memory units. These addresses indicate the location in the memory units at which instruction words or numeric operand words are to be found, and cause the memory units to deliver these words. During phase 1, the control arithmetic processor delivers an address to the memory units over bus 2. During phase 2, the processor receives an address from a memory unit and may index it and deliver the indexed address to a memory unit over bus 2. During phase 3, the processor may or may not function, depending on the operation command received during phase 2. At phase 1 of the next instruction step, the processor generally delivers the address delivered in the previous step but augmented by one. To perform these operations, the control arithmetic processor contains registers for storing addresses and indexing numbers, and an adder circuit for performing the indexing. A more complete description of the control arithmetic processor will be given later in conjunction with FIG. 5.

The read only memory 26 contains the permanent program and associated constants for a given mission. It does not receive data during a mission, but only delivers it. The computer system includes complete replicas of the read only memory as replacements.

The read-write memory units 28 and 30 store and deliver the information generated during computations. They may also store additional programs for the computer. Each read-write memory unit has three modes of operation; a standard mode, an auxiliary mode, and a relocated mode. In the standard mode, the unit serves as the main or original unit, receiving and transmitting information for participating in the current computer operations. In the auxiliary mode, the unit serves as a powered spare unit for duplicating a designated main unit. In the auxiliary mode it receives and stores information sent to its main unit so that it is ready to be switched to a standard mode to replace a faulty main unit, and to check the main unit operation. The auxiliary or spare unit stores the same inputs as the main unit. However, while the main unit reads out its word to the bus, the auxiliary unit only reads out the same word internally and compares it to the word on the bus. If the words disagree, the auxiliary unit signals a comparison error to the CDU. If the fault persists after repeat of the last program steps, the main or auxiliary unit may be replaced. In the relocated mode, the address of the unit is redesignated, so that it can serve as a main unit for either the first memory 28 or the second memory 30. This allows more flexible use of the spares. Up to 12 read-write memory units of 4096 capacity words each, may be used at one time in one system which has been designed.

The input-output unit 34 and interrupt unit 32 serve as interfaces with the external world. The input-output unit 34 contains buffer registers for receiving and delivering machine words. The interrupt unit 32 receives commands and service requests from parts of the spacecraft system outside of the computer system. An interrupt is requested from the CDU and is effected when the interrupt unit, during phase 2, places a properly coded instruction word on the first bus. Such interrupt occurs when the instruction word preempts the delivery of the next instruction specified by the sequence register of the control arithmetic processor 22. Phase 1 is omitted during an interrupt.

The system clock unit 36 contains counters needed for the sequencing and time keeping functions of the computer and the spacecraft. For example, the clock unit may initiate a program portion every hour, which causes a radiation measurement to be made. The clock unit outputs are coded machine words, so that they can be checked for errors by the bus checkers. The clock unit generates an internal interrupt request when a preset count has been reached.

The two bus checkers 14 and 16 check all machine words transmitted on the two busses for validity of encoding. The ciricuitry for checking arithmetic codes includes a four-bit check sum accumulator, and a four-bit modulo 15 adder which adds the bytes being transmitted to the word in the check sum accumulator. The checking of non-numeric two-out-of-four operation code bytes is carried out by a separate logic circuit. In order to assure that no checking for an arithmetic or residue code is made when a two-out-of-four code word is on a bus, the the CDU provides a signal to the bus checkers to prevent such checking when a two-out-of-four code is being transmitted. The bus checkers have a relatively small size, and are physically incorporated in the CDU, using its power supply and counter signals. The error signals E1 and E3 have the value one when the current check sum is not 1111, and the error signals E2 and E4 have the value one when the current byte is not a two-out-of-four byte.

(4) Description of control and diagnostic unit

The control and diagnostic unit (CDU) 18 issues control signals which initiate and time each step of operation of the system, and it controls recovery actions when a fault occurs. A description of the manner in which an instruction is carried out by the computer system will aid in the understanding of the CDU 18. The programs to be carried out by the computer are contained in the read only memory 26 and in the read-write memories 28 and 30. The complete program of operations may comprise perhaps 64,000 separate sequenced instruction steps, all contained in the memory. A typical instruction is carried out in three phases, referred to as phases 1, 2 and 3. In phase 1 the CDU 18 delivers a sync pulse, and delivers one 4-bit phase byte to bus 1 which carries it to the control arithmetic processor 22. This byte commands the processor 22 to deliver an address stored therein to bus 2. This address is an address in one of the memory units 26, 28 or 30.

In phase 2 of an instruction step, the memory units 26, 28 or 30 containing the address received on bus 2 during phase 1 delivers the instruction word contained at that address. This instruction word is delivered over bus 1 so that it can be received by any of the functional units. The first portion of the instruction word is the 3-byte operation command portion (see FIG. 2C), which designates the the particular functional unit which will perform the computation or other operation in the following phase 3. The operation command portion also designates the particular operation, such as an addition or a multiplication to be performed in phase 3. The last part of the instruction word from the memory unit is the 5-byte address portion which indicates where the numeric operand word is to be found on which the operation is to be performed. The address portion passes through the control arithmetic processor 22 which indexes it, if required, and delivers the indexed address over bus 2. The indexed address designates an address in one of the memory units 26, 28 or 30 wherein the numeric operand word to be acted upon is located.

In phase 3 the memory unit containing the address of the numeric operand word to be acted upon, delivers that 8-byte numeric operand word over bus 1. The functional unit which was designated in phase 2 as the unit to perform the operation, receives the numeric operand word and performs the required operation. The result is delivered to the proper bus. This result may be stored in one of the memory units or delivered through the input-output unit 34 to a circuit outside of the computer system.

Figure 4:
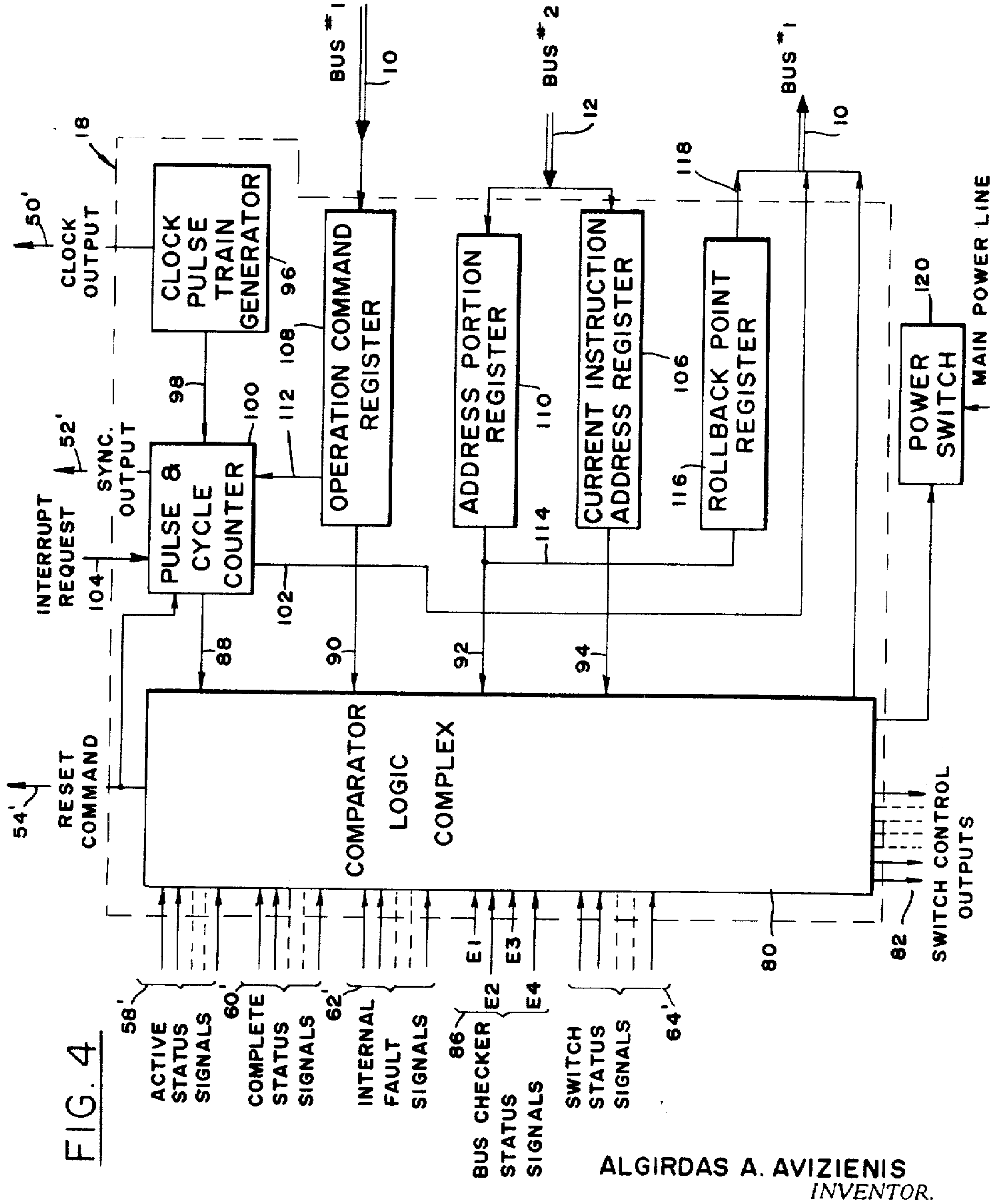
FIG. 4 is a block diagram representation of a Control and Diagnosis Unit of the system of FIG. 1.

Reference is now made to FIG. 4 which shows the CDU 18 in greater detail. The CDU has a comparator logic complex 80 which determines which unit is at fault when a fault occurs. The complex 80 has switch control output lines 82 which operate power switches to remove power from a faulty functional unit and apply it to a spare. The complex also has a reset command output 54' which delivers pulses to the reset inputs (shown at 54 in FIG. 3) of functional units. The reset pulses are delivered when a portion of the program must be repeated either to correct for a transient fault or after a faulty unit has been replaced.

Some of the inputs to the complex 80 are received directly from functional units. These include groups of inputs 58', 60' and 62' from the functional units (connected to outputs 58, 60 and 62 of each functional unit), indicating whether each functional unit is actively delivering an output, has completed an operation, or has an internal fault, respectively. Another group of such inputs 64' (connected to output 64 of each unit) is received from the power switches controlling the energization of each of the functional units, to indicate whether the switch is open or closed. Still another group of inputs 86 represents the four inputs from the two bus checkers.

The complex 80 has four additional inputs 88, 90, 92 and 94 which it receives from the internal circuitry of the CDU. These four additional inputs indicate which of the functional units in the computer system has a fault when one of the functional units delivers a faulty output. Thus, for example, if the output from a bus checker indicates that a word on a bus is erroneous, the CDU can determine which functional unit was delivering the word. A pulse and cycle counter 100 has outputs (not shown) connected to the registers within the CDU to control them.

The operation of the CDU can best be understood by considering the execution of an instruction step through phases 1, 2 and 3 in detail, and particularly the role of the CDU in the execution. The CDU has a clock pulse train generator 96 which controls the basic timing of the computer system operation. The generator 96 has two outputs 50' (connected to the sync input 50 of each unit) and 98, each of which carries a train of evenly spaced pulses at a frequency such as 1 megacycle. The pulse and cycle counter 100 receives clock pulses and uses them to define the length of each of the three phases 1, 2 and 3. Ten clock pulses define one cycle. Phases 1 and 2 are each of one cycle duration, i.e., ten pulses duration. Phase 3 is an integral number of cycles in length. This difference is due to the fact that phases 1 and 2 are simple and can always be performed in a short length of time. Phase 3, however, may involve complex computations; for example, a division operation may require thirty cycles.

An instruction step is begun when the pulse and cycle counter 100 delivers a synchronizing pulse on its sync output 52' to the sync input of each functional unit. Another output 102 of the counter is a 4-bit word delivered to bus 1 and through the control arithmetic processor (shown at 22 in FIG. 1) to line 2, indicating whether a normal or abnormal instruction step is to occur. In a normal instruction step, phase 1 is occupied by the delivery of an address from the control arithmetic processor to the memory units. In an abnormal instruction step, the control arithmetic processor does not deliver an address during phase 1. An abnormal instruction occurs when an external unit is interjected to control one instruction step (e.g., to enter data into a memory unit) or an internal interrupt is to occur.

In an abnormal step, an interrupt request signal from the interrupt unit (shown at 32 in FIG. 1) is delivered over line 104 to the counter 100 before phase 1 begins. The interrupt request indicates that during phase 2, when an instruction word would normally be delivered by one of the memory units, an instruction word will instead be delivered by the interrupt unit 32 to the first bus. When an interrupt request is received at 104, the counter 100 delivers a 1-byte "phase 2 designation word" at 102 indicating to all functional units that phase 1 will be omitted and that the current phase is an abnormal phase 2. This 1-byte word at 102, which is delivered over bus 1, and through the control arithmetic processor to bus 2, is in a two-out of-four coding so it can be monitored by the first bus checker. After delivery of an instruction word during an abnormal phase 2, the functional units act on it in the same manner as they act in a normal phase 2. Phase 3 may then occur in the same manner as for a normal instruction step.

During phase 1 of a normal instruction step, the one byte counter output at 102 is delivered over the first bus to the control arithmetic processor 22. The byte from the counter 100 instructs the control arithmetic processor 22 to deliver its current instruction address over the second bus to the memory units. This current instruction address is also received by the CDU and entered into a current instruction address register 106 whose input is connected to the second bus. The reason why this address is entered into the register 106 is to provide an indication as to which memory unit 26, 28 or 30 in FIG. 1 was supposed to have acted on the address from the control arithmetic processor during phase 1. If the addressed memory unit is not operating properly during phase 2, the logic complex 80 can consult the register 106 by receiving its output at 94, to determine which memory unit is at fault.

During phase 2 of a normal instruction, a memory unit delivers an instruction word. If the memory unit addressed during phase 1 is operating properly, it delivers an instruction word from the address designated by the output from the control arithmetic processor during phase 1. This instruction word is delivered over bus 1, and through the control arithmetic processor to bus 2, so it can be received by any of the functional units. The first part of the instruction word is a 3-byte operation command portion. The operation command portion indicates which of the functional units is to perform the operation, and what operation it is to perform. This operation command portion is also received and then entered into an operation command register 108 of the CDU. In case a faulty output is delivered by a functional unit during phase 3, the logic complex 80 can interrogate the operational command register 108 through line 90 to determine which functional unit is supposed to be operating. The operation command register 108 also delivers signals over line 112 to the counter 100 indicating the number of cycles required to perform the designated operation during phase 3. For example, a simple entry of information during phase 3 may require 1 cycle, while an arithmetic division may require 30 cycles. If the unit operating during phase 3 does not complete its operation in the designated time, the output 88 from the counter to the logic complex 80 can indicate this.

The address portion of the instruction word delivered by a memory unit during phase 2 is received by the control arithmetic processor 22. The control arithmetic processor generally receives this address portion, indexes it if so instructed by the preceding operation command, and delivers the indexed address to the second bus. The indexed address delivered during phase 2 designates a memory unit, and the address within that memory, unit wherein a numeric operand word is to be delivered at the beginning of phase 3. An address portion register 110 of the CDU stores this indexed address delivered over the second bus by the control arithmetic processor. The indexed address is stored for use in case the memory unit which was supposed to receive the indexed address during phase 2 delivers a faulty output at the beginning of phase 3. The logic complex 80 can determine which memory unit is at fault by interrogating the address portion register 110 through line 92.

Phase 3 of an instruction step is different for every different operation command. During phase 3, a numeric operand word in one of the memory units may be delivered over bus 1. The numeric operand word is taken from an address designated by the indexed address delivered from the control arithmetic processor during phase 2. This numeric operand word may be merely entered into an accumulator register of a functional unit or may be operated on in a complex manner. A word may also be transferred from a processor unit to a memory unit during phase. 3.

If no fault occurs, the program in the read only memory 26, or the read-write memories 28 and 30, is advanced after every instruction step until a step is reached which commands a halt. However, if a fault is detected by the logic complex 80 in the CDU, the CDU performs fault confirmation and recovery steps. When a fault is first discovered by the logic complex 80, it rolls back the program to a designated previous instruction step and begins the program from that rollback point. When such a rollback occurs, the functional units (except the memory units) which contained information must be reset so that the information is cleared out. Such resetting is accomplished by delivery of a reset command over the reset command output 54' of the logic complex 80. After rollback, the program is advanced, step by step, and if the fault was only a transient fault, then the program should be executed correctly the second time. If, however, the fault is repeated, the logic complex 80 notes this fact and must take a new corrective step. The new corrective step consists in again rolling back the program to the rollback point and also replacing the offending functional unit with a spare. The logic complex 80 can determine which functional unit is at fault by interrogating its many inputs, as discussed above.

The rollback point to which the program rolls back after a fault is detected is designated in the program of the read only memory 26 or read-write memories 28 and 30. When the program is originally written, rollback points are designated at various places in the program. A rollback point is typically placed at the beginning of a series of related instruction steps. The relationship of the steps is such that no data is required at the beginning of the series which is contained in any functional unit except a memory unit.

Whenever a rollback point is reached by the computer system in progressing through the program, its address will have been entered into the address portion 110 during phase 2. When an address in the register 110 is indicated by the current operation command in register 108 to be a rollback point address, this address is delivered over line 114 to rollback point register 116 of the CDU. When the next rollback point is reached, the previous rollback point in register 116 is erased, and the address of the new rollback point is entered into the register 116. A rollback point is designated by an instruction step which instructs the address portion register 110 to enter its address into the rollback point register 116.

When a fault is detected, the logic complex 80 delivers a reset command on its output 54' and delivers a fault signal to pulse and cycle counter 100. The reset command at 54' erases all information stored in the functional units, except the memory units, and resets them to a standard starting condition. The fault signal to the counter 100 instructs it to deliver a sync pulse on its output 52', and to deliver a "phase 2 designation word" (indicating that phase 2 of the current instruction step is an abnormal phase 2) followed by a 3-byte "unconditional transfer" operation command on its output 102.

Figure 5:
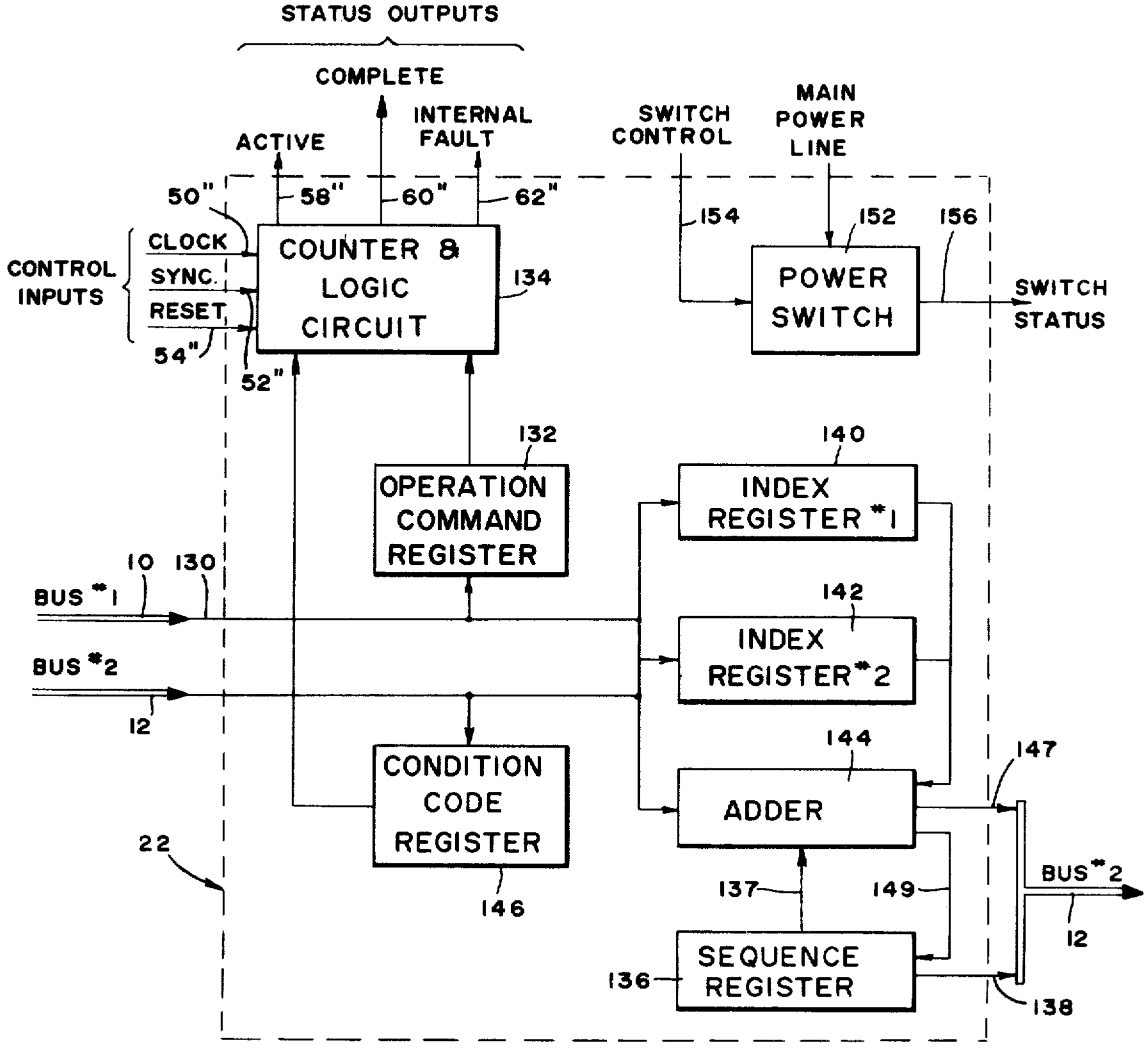
FIG. 5 is a block diagram representation of a control arithmetic processor of the system of FIG. 1.

The 3-byte unconditional transfer operation command at 102 commands the control arithmetic processor 22 to store the following address part in its sequence register (at 136 in FIG. 5). The rollback point register 116 then delivers an address on its output 118 to the first bus. This rollback point address is entered into the control arithmetic processor, which delivers it to the memory units during the next instruction step so that the program resumes at the last rollback point which has been passed.

The use of rollback points in a program and a rollback point register is for the purpose of reducing the recovery time of the computer system. In many computers, the detection of a fault results in the computer beginning the program again at the first instruction. An entire program may conssit of many thousands of instruction steps, a typical computer for long spacecraft voyages utilizing a program having a number of instructions on the order of 64,000. While many instruction steps can be executed in a very short time, such as 30 microseconds, other instruction steps may cause the execution of a "loop" sequence of instructions. A loop sequence of instructions may require the repetition of the same instruction steps many times, such as a thousand times, so that a considerable length of time is required to complete the "loop" sequence. For example, the loop instruction sequence may command the addition of a long column of numbers, which may require a long period of time. Thus, if the program had to be started at the beginning, a long period, such as many seconds or even minutes, may be required to reach the point at which a fault was detected. Such a delay may be permissible in some applications where data is not acted on in real time. However, many computations required of the computer system, in terminal guidance and other maneuvers, must be acted on in real time. Therefore, delays of more than a small fraction of a second cannot be tolerated. The inclusion of rollback points limits the recovery time to a limited number of instruction steps, so that recovery time is very short.

Protection against faults in the CDU 18 itself is realized by simultaneously operating three powered CDU's. The outputs of the three CDU's are connected to circuitry which takes a majority vote of all CDU outputs and delivers the majority command to the functional units. In case of a two-to-one vote on an output line, the disagreeing CDU disconnects its own power by operating its power switch 120. A fourth powered standby copy of the CDU is maintained in the system. When the two remaining CDU units note that the third CDU has turned itself off, they admit the powered spare CDU unit to the voting on the outputs, and also turn on the power to a new or fifth, standby CDU.

The individual functional units of the computer system, including the control arithmetic processor 22, may be of conventional types, and therefore no detailed description of their operation is given. However, since the control arithmetic processor 22 is extensively acted upon by the CDU, as described above, a general description of its construction will aid in the understanding of the CDU 18 and the computer system generally.

FIG. 5 is a block diagram of the control arithmetic processor 22. The processor contains a 20-bit sequence register 136, which holds the address of the next instruction and delivers it over its output 138 to the second bus during phase 1.

Also, during phase 1, the address in the sequence register 136 is sent on line 137 to the adder which increments the coded address by one and returns it on line 149 to the sequence register 136. The processor also contains two 20-bit index registers 140 and 142 which hold address portions, and an adder 144 which may be commanded by an operation command to add the contents of one of the index registers to a current address. During phase 2, the output of the adder 144 is delivered over line 147 to the second bus. A 4-bit condition code register 146 holds the sign information previously supplied by the main arithmetic processor and needed for completing conditional jump instructions. A 12-bit operation command register 132 retains an operation command received during phase 2. A counter and logic circuit 134 has input lines 50″, 62″ and 54″ for receiving signals from the CDU and output lines 58″, 60″ and 62″ for delivering signals to the CDU, and contains the logic circuitry for generally controlling the operation of the processor.

During phase 1, at the beginning of an instruction step, a 4-bit byte from the CDU is received over input 130 from bus 1. This byte enters the operation command register 132, which delivers a signal to the counter and logic circuit 134. The circuit 134 determines whether the control arithmetic processor 22 shall deliver an address during phase 1 (which it generally does during a normal operation step). If the processor has been instructed to deliver an address during phase 1, the sequence register 136 delivers the address it holds over its output line 138 to the second bus. The address from the sequence register 136 is received by the memory units of the computer system to enable them to act during phase 2. At the same time as the sequence register 136 delivers the address it holds, a new address is entered into the sequence register. This is accomplished by the adder 144 which increments the address in the sequence register 136 by one and delivers it over line 149 to the sequence register. The incrementing by one involves the addition of one to the address bytes $a0$ through $a3$ (shown in FIG. 2C) and adding the check symbol 14 by modulo 15 addition to the check byte $c(a)$ of the address portion held in the sequence register.

At the beginning of phase 2, the 3-byte operation command is received over bus 1 and delivered through the control arithmetic processor to bus 2, for receipt by all functional units. If the operation command happens to be directed to the control arithmetic processor 22, the operation command register 132 delivers a signal to the counter and logic circuit 134. Otherwise, the processor does not act during phase 3. During the latter part of phase 2, a 5-byte address portion is received over bus 1. If the operation command in register 132 requires it, the address portion received during phase 2 is entered into the adder 144 and added to the residue-coded address portions contained in one of the index registers 140 or 142. Otherwise, the address portion received during phase 2 is merely transferred through the adder 144 to the second bus.

During phase 3, a numeric operand word is received over bus 1. In most cases, the processor 22 does not act on the numeric operand word. However, it may be that the previously received operation command required the numeric operand word to be entered into one of the index registers or the sequence register, in which case the processor does act during phase 3. The counter and logic circuit 134 controls the functioning of the other units of the processor. It receives three control inputs 148 from the CDU and delivers three status outputs 150 to the CDU. A power switch 152 controls power to the processor, and it has a switch control input 154 from the CDU and a switch status output 156 leading to the CDU.

Figure 6:
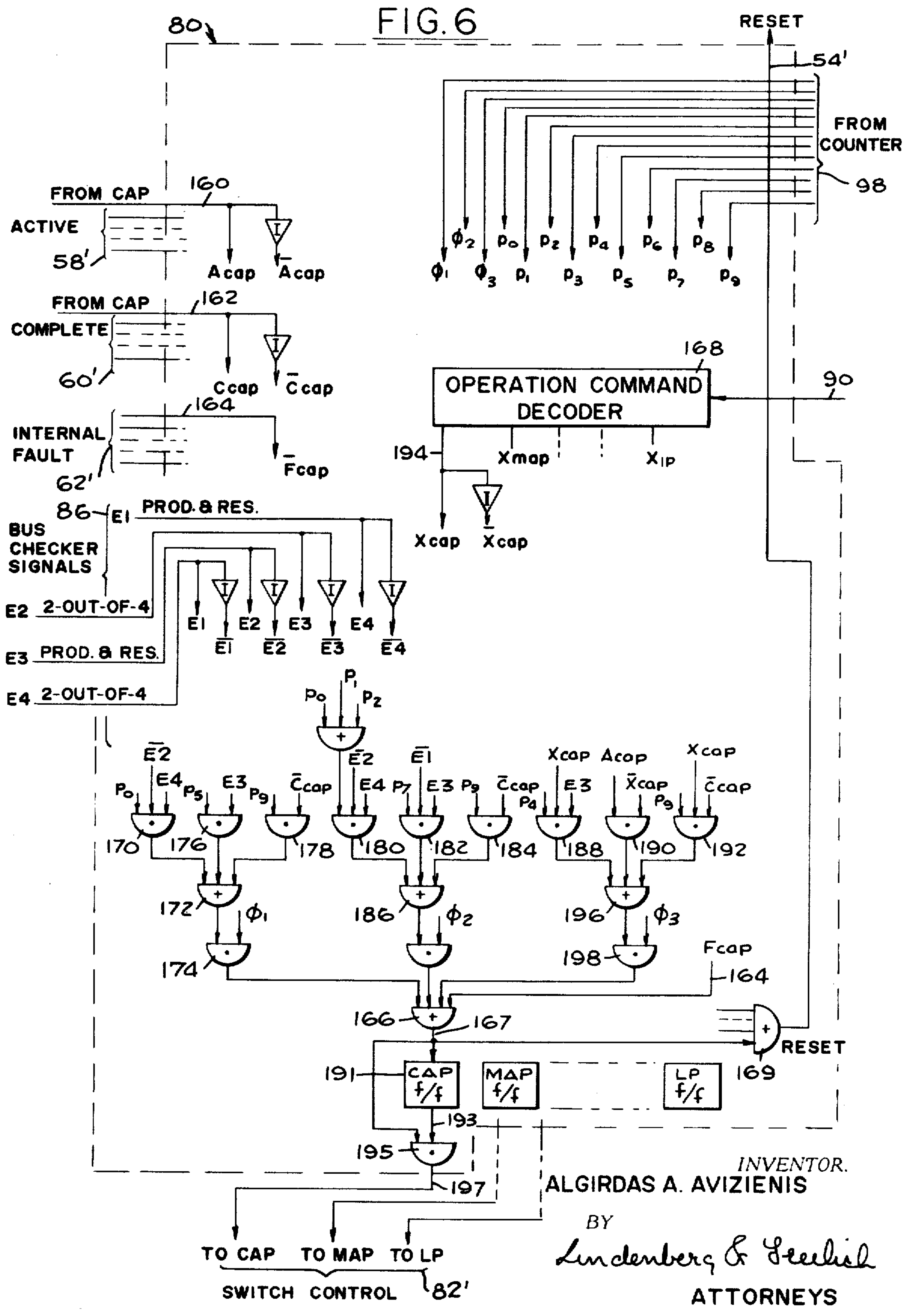
FIG. 6 is a partial block diagram representation of the comparator logic complex of the Control and Diagnostic Unit of FIG. 4, showing the circuitry for detecting and correcting faults in the control arithmetic processor unit.

(5) Detection of faults in control arithmetic processor and main arithmetic processor The comparator logic complex 80 of the CDU shown in FIG. 4 contains circuitry for detecting a variety of faults in the various functional units of the computer system. A description of typical portions of the comparator logic complex will aid in understanding the manner in which fault locations are determined and corrections are made. FIG. 6 is a partial block diagram of the comparator logic complex 80, showing the circuitry involved in correcting for a variety of faults of the control arithmetic processor, shown at 22 in FIG. 1, which may occur during an instruction step.

The portion of the comparator logic complex 80 of the CDU shown in FIG. 6 comprises active status signal input 58′, complete status signal inputs 60′, internal fault signal inputs 62′, and bus checker status signal inputs 86. Of these inputs, lines 160, 162 and 164 are from the control arithmetic processor 22. The four bus checker inputs 86 carry fault indicating signals when an error is detected on one of the busses. Inputs E1 and E3 carry signals indicating that the check sum of a product or residue code is not equal to 1111, while lines E2 and E4 carry signals indicating that a two-out-of-four error has been detected in the byte being currently transmitted on the bus. Another group of inputs 98 are received from the pulse and cycle counter 100 of the CDU. The inputs 98 comprise 13 lines. Line $\phi_1$ carries a pulse during every one of the ten pulses of the first phase. Similarly, lines $\phi_2$ and $\phi_3$ carry pulses during the second and third phases, respectively. Line $p$0 carries a pulse during the first of the ten pulses constituting each cycle while line $p$9 carries a pulse during the tenth pulse of a cycle. (Note that phase 3 may last for many cycles.) Still another input 90 to the comparator logic complex receives the operation command held in the register 108 of the CDU.

The partial circuit shown in FIG. 6 can detect the existence of ten types of faults occurring in the control arithmetic processor. One of these faults is an internal fault, such as internal disagreement of a duplicated critical function, which may occur at any time during an instruction step. Other types of faults include the delivery of erroneous addresses from the control arithmetic processor or the operation of the processor during times when it should not be operating. If any of the ten types of faults occur, an OR gate 166 delivers an output, which initiates recovery procedures.

The ten types of faults in the control arithmetic processor which are monitored by the circuit of FIG. 6, and which give rise to an output from OR gate 166, can be expressed by the following equation:

$$R_{cap}=\phi_1(p0\cdot\overline{E2}\cdot E4+p5\cdot E3+p9\cdot\overline{C}_{cap})+\phi_2[(p0+p1+p2)\cdot\overline{E2}\cdot E4+p7\cdot\overline{E1}\cdot E3+p9\cdot\overline{C}_{cap}]+\phi_3(p4\cdot E3\cdot X_{cap}+\overline{X}_{cap}\cdot A_{cap}+p9\cdot X_{cap}\cdot\overline{C}_{cap})+F_{cap} \quad \text{Equation 1}$$

where $\phi_1$, $\phi_2$ and $\phi_3$ are phase signals providing pulses during every pulse period of their respective phase, $p$0 through $p$9 represent pulses occurring at the first through tenth pulse times during each cycle of a phase, $C_{cap}$ is the control arithmetic processor "complete" signal received at 162, $A_{cap}$ is the control arithmetic processor "active" signal received over line 160, $X_{cap}$ is the output of an operation command decoder 168 on the $X_{cap}$ line at 194, indicating that the control arithmetic processor should deliver an output during phase 3, and $F_{cap}$ is the internal fault signal output from the control arithmetic processor, received at line 164.

The first term in the above equation, $p0\cdot\overline{E2}\cdot E4$, which can occur during phase one, is detected by AND gate 170. This term represents the situation where, during the first pulse ($p$0) of phase 1, the control arithmetic processor 22 deliver a 4-bit phase byte command, which it receives on bus one 10 to bus two 12. If the command received by the control arithmetic processor over the first bus (delivered by pulse and cycle counter 100 of the CDU on its output 102) is proper, but the output of the control arithmetic processor is erroneous, line E2 from the first bus checker will not provide a fault signal but line E4 from the second bus checker will deliver a fault-indicating signal. When line E4 delivers a signal, but line E2 does not during the first pulse of a cycle, AND gate 170 delivers an output to OR gate 172. If this occurs during phase 1, AND gate 174 delivers an output to OR gate 166.

The second term in Equation 1, $p5\cdot E3$, is monitored by AND gate 176. This term covers the situation occurring during the fifth pulse of phase 1, when the control arithmetic processor has completed the delivery of an address, held in its sequence register, to bus 2. During pulses $p$1 through $p$5 of phase 1, the control arithmetic processor delivers a 5-byte address to the second bus. If this 5-byte word is erroneous, the second bus checker will detect a residue code error, and line E3 will deliver a fault-indicating signal. When such a fault-indicating signal occurs during pulse time $p$5, AND gate 176 delivers an output through OR gate 172 to AND gate 174. If this occurs during phase 1, AND gate 174 delivers a pulse to OR gate 166.

A third term in Equation 1, $p9\cdot\overline{C}_{cap}$, is monitored by AND gate 178. This term represents the lack of a "complete" indicating signal over line 162 from the control arithmetic processor during the last pulse of phase 1. A functional unit which performs an internal activity during a phase delivers a complete-indicating pulse during the last pulse of the phase. If, during pulse $p$9, no complete-indicating pulse is received on line 162, AND gate 178 delivers a pulse to OR gate 172 which passes it through AND gate 174 if it occurs during phase 1. OR gate 166 then receives a pulse.

The next three terms in Equation 1 represent faults occurring during phase 2, and result in a pulse from one of the AND gates 180, 182 or 184. The first of these terms is $(p0+p1+p2)\cdot\overline{E2}\cdot E4$. During the first three pulses of phase 2, the control arithmetic processor passes a 3-byte operation command portion from bus 1 to bus 2 (without indexing it). If the 3-byte operation command received on bus 1 is correct but the 3-byte operation command delivered to bus 2 is incorrect, the E2 line will not deliver a fault signal but the line E4 will. If this occurs, AND gate 180 will deliver a pulse to OR gate 186.

Another fault occurring during phase 2, represented by the term $p7\cdot\overline{E1}\cdot E3$, is the delivery of an erroneous 5-byte address during pulse $p$3 through $p$7. Whether the address is erroneous or not is not determined by the bus checkers until all five bytes have been received, i.e., not until pulse $p$7. If, at pulse $p$7, the address delivered over the first bus to the processor is correct, line E1 will not deliver a fault-indicating signal. However, if the address delivered by the control arithmetic processor to the second bus is erroneous, line E3 will deliver a fault-indicating signal. If both of these events occur at pulse $p$7, AND gate 182 will deliver a pulse to OR gate 186. The other term during phase 2, $p9\cdot\overline{C}_{cap}$, represents the fact that AND gate 184 checks for receipt of a complete-indicating signal during pulse $p$9.

The next three terms in Equation 1 represents faults occurring during phase 3, and result in a pulse from one of the AND gates 188, 190 or 192. Two of these three faults are monitored only for the case wherein the control arithmetic processor has been commanded to act during phase 3. Whether or not the control arithmetic processor has been designated to operate during phase 3 is determined by an operation command decoder 168. The input 90 of the decoder carries the operation command in the register 108 of the CDU. If this operation command, delivered during phase 2, indicates the control arithmetic processor is to operate during phase 3, line 194 will carry an output $X_{cap}$ during the entire phase 3.

The only operation which would be commanded of the control arithmetic processor during phase 3 is an instruction to unload the 20-bit address in one of its three registers 140, 142 and 136. A fault in unloading is indicated by the term $p4\cdot E3\cdot X_{cap}$ in Equation 1, during phase 3. The unloading of the 5-byte address in one of the registers of the control arithmetic processor occurs during the first five pulses $p$0 through $p$4 of phase 3. If, during the fifth pulse $p$4, a residue error is detected by the second bus checker, a fault-indicating signal will be received at E3.

If this occurs when the control arithmetic processor is supposed to operate, another input $X_{cap}$ will be delivered to AND gate 188, which will deliver a pulse through OR gate 196. Such an occurrence during phase 3 results in a pulse through gate 198 to OR gate 166. The other term, $p9 \cdot \bar{C}_{cap}$, indicates lack of a "complete" signal at the end of an active phase 3.

The term $\bar{X}_{cap} \cdot A_{cap}$ in Equation 1 indicates the activity of the control arithmetic processor during phase 3 when it should not be active. The fact that it should not be active is indicated by the appearance of $\bar{X}_{cap}$, and the fact of activity is indicated by the signal $A_{cap}$ from line 160. Thus, various faults can be detected by determining whether the control arithmetic processor is operating when it has been designated to operate or to be quiescent.

The various gates which utilize outputs from the operation command decoder 168 serve as comparing means for comparing signals indicating the functioning of the control arithmetic processor with signals from the decoder which indicate whether the processor has been designated to perform an operation. The term $F_{cap}$ occurs when internal circuits of the control arithmetic processor detects a discrepancy. A pulse on the $F_{cap}$ line 164 may occur at any time, and it is transmitted directly to OR gate 166.

If any of the foregoing ten types of faults occurs in the control arithmetic processor 22, the OR gate 166 delivers a pulse on its output 167. A pulse at 167 is delivered to OR gate 169, which receives similar pulses from other circuits of the comparator logic complex 80, that detect faults in other functional units. The pulse at 167 passes through the OR gate 169 to the reset line 54'. The pulse at reset line 54' resets all of the functional units, and commands the pulse and cycle counter 100 of the CDU to generate signals commanding a rollback to the last rollback point address. Such rollback point is held in the rollback point register 116 of the CDU, and rollback is accomplished in the manner described above.

The pulse from OR gate 166 also passes to a CAP flip-flop 191. This pulse changes the CAP flip-flop to a state wherein it thereafter delivers an output "one" on its output line 193 (until such time as recovery has been completed). In addition the pulse over line 167 passes to an AND gate 195. The initial pulse delivered over 167 to the AND gate 195 does not go through the gate 195. This is because the flip-flop 191 was not delivering a signal on its output 193 at the time a pulse was delivered over line 167. Thus, the first pulse output from OR gate 166 changes the state of the flip-flop 191 and causes the computer program to roll back and resume the program at the last rollback point which has been passed.

If the fault in the control arithmetic processor 22 is transient, the program will continue without the generation of another fault-indicating signal from OR gate 166, and flip-flop 191 wil be placed back into its original state, wherein it delivers no output. However, if a fault again occurs in the control arithmetic processor when the same or an earlier instruction is encountered, another pulse will be delivered from the OR gate 166 on its output 167. This second pulse will pass through AND gate 195, because flip-flop 195 is now delivering an output at 193. The output 197 from the AND gates 195 is one of the switch control outputs 82' that controls the power switches. A pulse on line 197 is delivered to the currently operating, or original, main arithmetic processor power switch to turn it off and to switch on power to the spare main arithmetic processor in the system. The second fault signal at OR gate 166 is also delivered over the reset line 54' to again cause the program to roll back to the stored rollback point.

Figure 8:
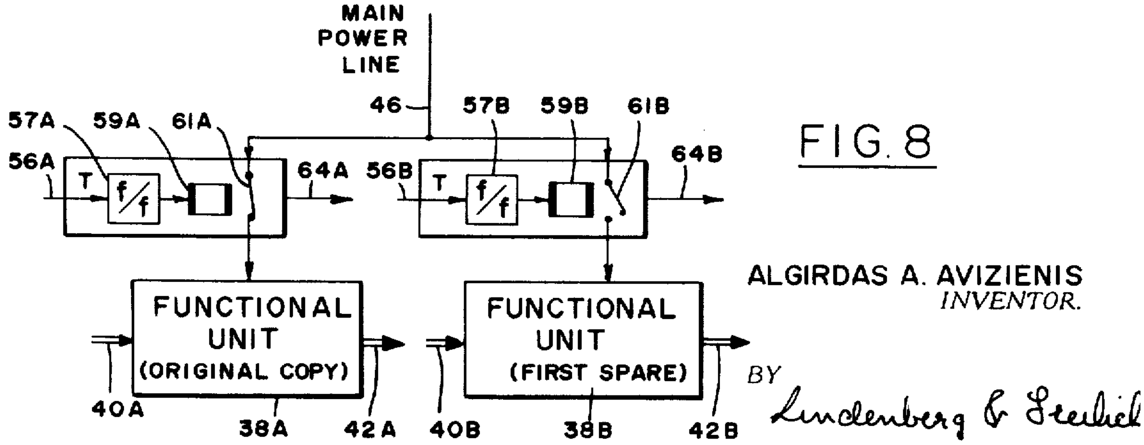
FIG. 8 is a simplified block diagram of an arrangement for replacing a unit with a spare.

FIG. 8 shows a simplified example of a switching arrangement, for the case of an original functional unit 38A and only one spare 38B. Such a unit may be a control arithmetic processor. A pulse from one of the switch control outputs 197 (shown in FIG. 6) of the CDU, which controls the functional units of FIG. 8, enters inputs 56A and 56B. The input at 56A triggers flip-flop 57A and causes it to deliver a signal to relay 59A that opens the contacts 61A. The same input delivered at 56B triggers flip-flop 57B and causes it to deliver a signal to relay 59B that opens the contacts 61B. Thereafter, the original unit 38A no longer receives power from power line 46, while spare unit 38B does receive power. Thus, unit 38A is replaced by its spare 38B.

Figure 7:
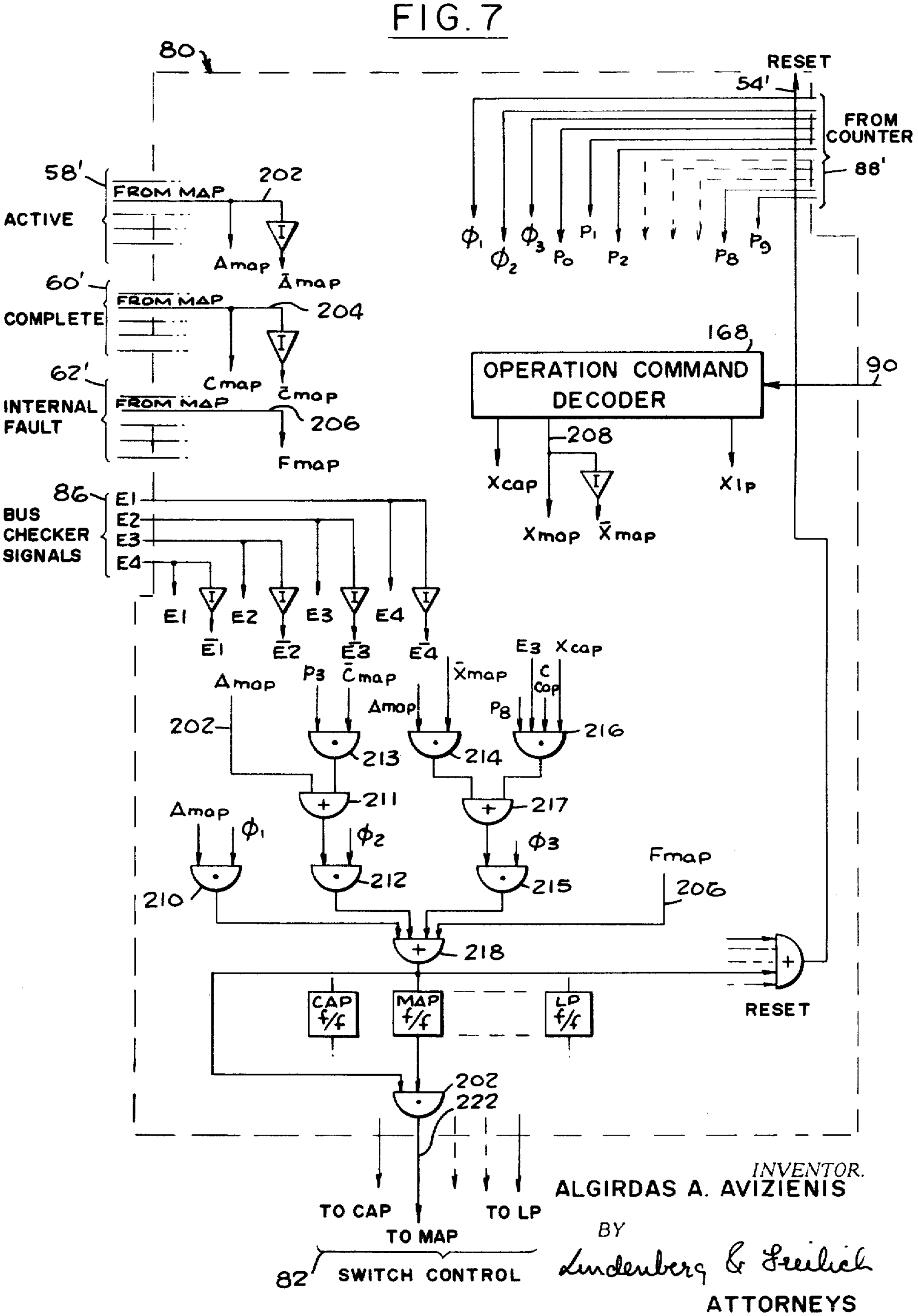
FIG. 7 is a partial block diagram representation of the comparator logic complex of the Control and Diagnostic Unit of FIG. 4, showing the circuitry for detecting and correcting faults in the main arithmetic processor unit.

FIG. 7 shows a portion of the circuitry of the comparator logic complex 80 which allows for the detection of six types of faults in the main arithmetic processor, shown at 20 in FIG. 1. The main arithmetic processor performs the more complex computations, such as addition, subtraction, multiplication, etc. The main arithmetic processor 20 is quiescent during phase 1. It is also quiescent during phase 2 except that it may receive an operation command during phase 2 instructing it to perform an operation on a numeric operand word to be received during phase 3 or to deliver a previously computed result during phase 3. Such an operation command portion will, of course, be entered in the operation command register 108 of the CDU.

The portion of the operation logic complex 80 of FIG. 7 includes inputs 58', 60', 62', 86, 88' and 90, and outputs 54' and 82 which were described in connection with FIG. 6. However, of the active, complete, and internal fault line inputs, the particular lines 202, 204 and 206 from the main arithmetic processor are shown in particular. The six types of faults in the main arithmetic processor 20 monitored by the circuit of FIG. 7 can be expressed by the following equation:

$$R_{map} = \phi_1 \cdot A_{map} + \phi_2 (A_{map} + p3 \cdot \bar{C}_{map}) + \phi_3 \cdot [\bar{X}_{map} \cdot A_{map} + X_{map} \cdot \bar{C}_{map} \cdot E3 \cdot p8] + F_{map}$$

Equation 2 where $\phi_1$, $\phi_2$, $\phi_3$, $p3$, and $p8$ are as defined above for Equation 1, $C_{map}$ is the "complete" signal from the main arithmetic processor, $A_{map}$ is the "active" signal from the main arithmetic processor, $X_{map}$ is the output 208 of the operation command decoder 168 indicating that the main arithmetic processor should operate during phase 3, and $F_{map}$ is the internal fault signal of the main arithmetic processor.

During phase 1, the main arithmetic processor should be quiescent. Therefore, if an active signal $A_{map}$ is received over line 202 during phase 1, an error is indicated and the AND gate 210 delivers an output. Similarly, the main arithmetic processor should produce no output during phase 2; if it does, AND gate 211 will receive an input $A_{map}$ and will deliver an output. A completion signal $C_{map}$ occurs on line 204 after the main arithmetic processor has accepted and stored the 3-byte operation command during pulses p0 through p2 of phase 2 (to determine whether it applies to the main arithmetic processor). Its absence during pulse p3 is indicated by the term $p3 \cdot \bar{C}_{map}$, which causes AND gate 213 to deliver a pulse.

During phase 3, the main arithmetic processor 20 is designated to be active or inactive, according to the operation command received during phase 2. If it is designated as inactive, an $\bar{X}_{map}$ signal indicating inactivity will be deliver to gate 214. If an $A_{map}$ signal occurs when $\bar{X}_{map}$ is present, it indicates a fault by reason of activity when the processor should not be active. If the processor should be active then during pulses p1 through p8 of the last cycle of phase 3 an output will be delivered from the processor to the second bus. At the pulse p8, a complete signal also will be received over line 204 from the processor. If the output is erroneous, the line E3 will deliver a pulse to AND gate 216 and cause it to deliver a fault-indicating pulse. Pulses from gates 214 and 216 pass through AND gate 217; if they occur during phase 3 they also pass through AND gate 215 to OR gate 218.

A fault occurring during any of the three phases, including an internal fault signal $F_{map}$, will result in OR gate 218 delivering an output. If OR gate 218 delivers an output, a recovery process is initiated in the same manner as for the control arithmetic processor described above. However, the power switches controlling the main arithmetic processor units will then be operated. A fault originating from the main arithmetic processor fault detecting circuitry of FIG. 7 will result in AND gate 220 delivering an output over line 222 which removes power to the currently operating main arithmetic processor and closes the power switch leading to the spare.

The CDU 18 contains additional circuitry for monitoring each of the other functional units. The monitoring schemes are chosen to detect the faults most likely to occur in each unit.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. In a computer system including a plurality of functional units for performing operations when designated to do so by the receipt of operation command signals, each of said units having an input, means coupled to said input for preparing the unit to perform an operation when designated to do so by an operation command, and an output for delivering data, the improvement comprising:

first means for generating operation command signals designating at least one of said functional units to perform an operation;

means coupling said first means to said inputs of said plurality of functional units, for carrying said operation command signals thereto;

monitoring means coupled to a first plurality of said functional units for monitoring their functioning;

comparing means responsive to said operation command signals generated by said first means and to said monitoring means, for comparing the functioning of each of said first plurality of functional units with the designations of said operation command signals; and means coupled to said comparing means for performing fault-correcting procedures, whereby to direct fault correction to a functional unit which does not perform in a manner directed by said operation command.

2. A computer system as defined in claim 1 wherein: said monitoring means comprises means for generating signals indicating the occurrence of active performance of an operation by internal circuitry of said first plurality of functional units, whereby to check whether a unit designated to be active is actually active.

3. A computer system as defined in claim 1 wherein: each of said first plurality of functional units includes means coupled to its output for delivering data encoded in an error-detecting code format; and said monitoring means comprises bus means coupled to said outputs of said first plurality of functional units, and bus checker means coupled to said bus means for indicating the occurrence of erroneously encoded data on said bus means.

4. A computer system as defined in claim 1 including: a plurality of spare functional units; and wherein said means for performing fault-correcting procedures includes means for removing power to a functional unit and activating a spare functional unit.

5. A computer system as defined in claim 1 including: memory means defining a program having a multiplicity of instruction steps, said memory means including means defining a plurality of rollback points which designate instruction steps at which it is convenient to resume said program; and wherein said comparing means include means for interrupting the operation of said computer system and resuming its operation at an instruction step designated by one of said rollback points.

6. In a computer system including a plurality of functional units for performing operations and counter means for controlling the times of operations of said functional units, the improvement comprising:

means in said counter means for generating signals defining discrete intervals;

means coupled to one of said functional units for indicating the existence of a predetermined state of activity of said unit;

gate means responsive to said signals defining discrete intervals and to said means coupled to one said functional unit, for generating fault signals when said functional unit has said predetermined state at one of said predetermined intervals; and means responsive to said fault signal from said gate means, for directing fault-correcting procedures to said functional unit.

7. A computer system as defined in claim 1 including: a spare unit for replacement of said functional unit; and wherein said means responsive to said fault signals comprises means for removing power to said functional unit and activating said spare unit to replace said functional unit.

8. A computer system as defined in claim 6 including: memory means defining a program having a multiplicity of instruction steps, said memory means including means defining a plurality of rollback points which designate instruction steps at which it is convenient to resume said program; and control means responsive to said fault signals for interrupting the operation of said computer system and resuming its operation at an instruction step designated by one of said rollback points.

9. A self-testing and repairing computer comprising:

a plurality of separate functional units for performing computer operations, a plurality of said units normally being in an operational state and at least one of said units normally serving as a spare unit for replacing a faulty operational unit, each of said units having input means for receiving data encoded by an error-detecting code, means for acting on data from said input means, and output means for transmitting data encoded by an error-detecting code;

bus means for coupling together said output means from a plurality of said functional units and said input means of at least one of said functional units;

checking means coupled to said bus means for generating fault indicating signals when data on said bus means has an error of the type indicated by a predetermined error-detecting code;

memory means defining a program having a multiplicity of sequenced instruction steps, for governing the operation of said functional units; and control means coupled to said memory means and said checking means, said control means including means for rolling back the program in said memory means to a previous instruction step after the generation of fault indicating signals, means for detecting which functional unit delivered data at a fault time when said checking means generated a fault indicating signal, and means for replacing said unit which delivered data at said fault time with said spare functional unit after at least one operation of said means for rolling back the program to a previous instruction step.

10. A self-testing and repairing computer comprising:

a plurality of separate functional units for performing computer operations, each of said units having input means for receiving data encoded by an error-detecting code, means for acting on data from said input means, and output means for transmitting data encoded by an error-detecting code;

bus means for coupling together said output means from a plurality of said functional units and said input means of at least one of said functional units;

checking means coupled to said bus means for generating fault indicating signals when data on said bus means has an error of the type indicated by a predetermined error detecting code;

memory means for storing a program having a multiplicity of sequenced instructions, said program including a plurality of roll back point instructions interspaced between other instructions of said program, said roll back point instructions defining convenient points for the resumption of said program after an interruption; and control means coupled to said memory means and said fault indicating signals generated by said checking means, for performing fault-correcting procedures including rolling back the program in said memory means after the receipt of said fault indicating signals, to the last roll back point instruction which has been passed.

References Cited

UNITED STATES PATENTS

| | | | |
|---|---|---|---|
| 3,252,149 | 5/1966 | Weida et al. | 340—172.5 |
| 3,302,182 | 1/1967 | Lynch et al. | 340—172.5 |
| 3,303,474 | 2/1967 | Moore et al. | 340—172.5 |
| 3,377,623 | 4/1968 | Reut et al. | 340—172.5 |
| 3,409,877 | 11/1968 | Alterman et al. | 340—172.5 |

MALCOLM A. MORRISON, Primary Examiner

C. E. ATKINSON, Assistant Examiner

U.S. Cl. X.R.

340—172.5